United States Patent
Adeel et al.

(10) Patent No.: US 12,354,306 B2
(45) Date of Patent: Jul. 8, 2025

(54) SYSTEMS AND METHODS FOR TRACKING OBJECTS IN VIDEOS USING MACHINE-LEARNING MODELS

(71) Applicants: Getac Technology Corporation, Taipei (TW); WHP Workflow Solutions, Inc., North Charleston, SC (US)

(72) Inventors: Muhammad Adeel, Edina, MN (US); Thomas Guzik, Edina, MN (US)

(73) Assignees: Getac Technology Corporation, Taipei (TW); WHP Workflow Solutions, Inc., North Charleston, SC (US)

( * ) Notice: Subject to any disclaimer, the term of this patent is extended or adjusted under 35 U.S.C. 154(b) by 363 days.

(21) Appl. No.: 17/881,423

(22) Filed: Aug. 4, 2022

(65) Prior Publication Data

US 2024/0046515 A1 Feb. 8, 2024

(51) Int. Cl.
- *G06T 7/73* (2017.01)
- *G06V 10/77* (2022.01)
- *G06V 10/774* (2022.01)

(52) U.S. Cl.
CPC ............ *G06T 7/75* (2017.01); *G06V 10/7715* (2022.01); *G06V 10/774* (2022.01)

(58) Field of Classification Search
None
See application file for complete search history.

(56) References Cited

U.S. PATENT DOCUMENTS

| | | | | |
|---|---|---|---|---|
| 11,468,617 B2 * | 10/2022 | Pinel | ................ | G06T 13/40 |
| 12,056,978 B2 * | 8/2024 | Avitan | ................ | G06V 40/40 |
| 2016/0188980 A1 * | 6/2016 | Martin | ................ | G11B 27/005 |
| | | | | 382/103 |
| 2021/0117529 A1 * | 4/2021 | Zamora Martínez | ... | G06F 21/32 |
| 2022/0129807 A1 * | 4/2022 | Beznos | ................ | G06F 18/254 |
| 2022/0139143 A1 * | 5/2022 | Avitan | ................ | G06V 40/40 |
| | | | | 382/112 |
| 2022/0222832 A1 * | 7/2022 | Fu | ................ | G06V 10/82 |

(Continued)

FOREIGN PATENT DOCUMENTS

| | | | | |
|---|---|---|---|---|
| KR | 102429379 B1 | 8/2022 | | |
| WO | WO-2021028061 A1 * | 2/2021 | ......... | G06F 18/2178 |
| WO | WO-2022188599 A1 * | 9/2022 | ............. | G06N 20/00 |

OTHER PUBLICATIONS

International Application No. PCT/2023/028881, International Search Report and Written Opinion mailed Nov. 9, 2023, 9 pages.

*Primary Examiner* — Tahmina N Ansari
(74) *Attorney, Agent, or Firm* — Finnegan, Henderson Farabow, Garrett & Dunner, L.L.P.

(57) ABSTRACT

A video file may be presented via a user application that displays one or more video frames of the video file. A user request to perform an object detection for objects of a specific object type in a video frame of the video file may be received from the user application. A machine-learning model of a plurality of machine-learning models that is configured to detect objects of the specific object type may be applied to the video frame to detect an object of the specific object type in the video frame. Each of the plurality of machine-learning models may be trained to detect objects of a corresponding object type. Subsequently, an object tracking algorithm may be applied to one or more additional video frames of the video file to track the object of the specific object type across the one or more additional video frames.

20 Claims, 8 Drawing Sheets

(56) References Cited

U.S. PATENT DOCUMENTS

| | | | |
|---|---|---|---|
| 2022/0292750 A1* | 9/2022 | Pinel | G06N 20/00 |
| 2022/0294971 A1* | 9/2022 | Dahlgren | G06F 18/2178 |
| 2024/0046515 A1* | 2/2024 | Adeel | G06V 10/82 |

* cited by examiner

SYSTEMS AND METHODS FOR TRACKING OBJECTS IN VIDEOS USING MACHINE-LEARNING MODELS

BACKGROUND

Law enforcement officers generally carry multiple body-worn electronic devices as they perform their law enforcement functions. For example, law enforcement agencies are increasingly mandating that their law enforcement officers carry and use portable recording devices to record audiovisual recordings of their interactions with the public. The recordings may serve to protect the public from improper policing, as well as protect law enforcement officers from false allegations of police misconduct. By using such portable recording devices, law enforcement officers may capture a significant amount of video data in the course of any given day. These video content may become the subject of great interest to the public, the courts, adverse parties, investigators, the law enforcement agencies themselves, and/or so forth. Each party may have different motivations for reviewing the captured video content. Given the large amount of such video content, it is often very tedious and time-consuming to identify the exact video content that is being sought so that irrelevant video content may be redacted before video files are released to a requesting party, but it is often necessary to do so in view of privacy concerns, data sensitivity concerns, legal concerns, and other concerns.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for selectively using multiple machine-learning models to detect objects in video files. Each of the multiple machine-learning models may be trained to detect a particular type of object. For example, one of the machine-learning models may be trained to detect human faces that are captured in the video frames of a video file. In another example, another one of the machine-learning models may be trained to detect human shapes that are captured in the video frames of a video file. In an additional example, a third of the machine-learning models may be trained to detect a specific kind of weapon, such as a gun, that is captured in the video frames of a video file. As used herein, an object being captured in a video file or a video frame of the video file refers to an image of the object being present in one or more video frames of the video file. Furthermore, while the term video file as herein may refer to a data file that contains video data; the term may also apply to data files that contain both video and audio data.

In various embodiments, a user that is reviewing (e.g., playing back) a video file via a content processing engine may notice that a video frame of the video file contains one or more objects of a specific object type that is of interest to the user. For example, the user may notice that the video frame shows several human faces. Accordingly, the user may use the user interface controls of the content processing engine to apply a machine-learning model that is trained to detect the objects of the specific object type to the video frame. In turn, the machine-learning model may detect and highlight the objects of the specific object type in the video frame. For example, the machine-learning model may be configured to prompt the content processing engine to draw a shape around each object of the specific object type that is detected, as well as present a text label that indicates the object type of each object detected.

Following a review of the objects detected by the machine-learning model, the user may use the user interface controls to initiate one or more additional data processing operations on each of the objects of the specific object type that is detected. In one instance, the user may initiate a tracking of the object of the specific object type across other video frames of the video file. For example, the content processing engine may apply an object tracking algorithm to the object of the specific object type so that as the object appears in other video frames, the content processing engine is able to highlight and identify the presence of the object in the other video frames. In another instance, the user may initiate a redaction of the object from one or more video frames in the video file. In such an instance, the content processing engine may apply the object tracking algorithm to the object of the specific object type until all appearances of the object in the one or more video frames are recognized. Subsequently, the content processing engine may apply a redaction algorithm to render the appearances of the object in the one or more video frames visually unrecognizable. For example, the redaction algorithm may apply a pixelation effect, a blurring effect, an opaque overlay effect, and/or some other obfuscation effect to the appearances of the object in the one or more video frames.

In other embodiments, the user interface controls of the content processing engine may be used to correct an erroneous object type classification of an object in a video frame by a machine-learning model. For example, if a particular machine-learning model that is trained to identify a gun in video frames erroneously identified a smartphone that is carried by a person as a gun, the user interface controls may enable a user reviewing the object detection to submit corrective labeling information indicating that an image of the detected object shows a smartphone rather than a gun. Subsequently, the image of the detected object and the corrective labeling information may be used as a part of training data to retrain the particular machine-learning model. In this way, the accuracy of the particular machine-learning model in recognizing an object of a specific object type may be improved.

In additional embodiments, the user interface controls of the content processing engine may be used to submit information that results in the training of a new machine-learning model to recognize a new type of object. In one implementation, the user interface controls may be used by a user to select an image of an object of a specific object type that is of interest to the user but for which no current machine-learning models of the content processing engine are able to recognize the object of the specific object type. In such an implementation, the user may select such an image of the object that is present in a video frame and indicate that the image captures an object of interest. Subsequently, if the number of submissions of the images with the objects of the specific object type exceeds a predetermined threshold, an administrator of the content processing engine may initiate the training of a new machine-learning model to recognize the objects of the specific object type and the integration of the new machine-learning model into the content processing engine. In this way, the content processing engine may be configured to detect the objects of the specific object type that the content processing engine was previously unable to detect.

The ability of a user to selectively apply different machine-learning models to video files, in which each single-purpose machine-learning model is trained to recognize objects of a corresponding type, may provide the user with greater control and improve object recognition accuracy when compared to the use of a conventional multi-use machine-learning model that is trained to recognize multiple types of objects. For example, while a machine-learning model that is trained to detect multiple types of objects may be applied to a video frame to detect objects of multiple types, such a machine-learning model may be prone to false or inaccurate object recognitions due to the dissimilarity in object appearances and the sheer variety of the training data. Furthermore, in some instances, it may be more computationally efficient to apply the single-purpose machine-learning model than a multi-use machine-learning model to a video file when a user is only interested in detecting objects of a specific object type as captured in the video file rather than objects of multiple types. The techniques described herein may be implemented in a number of ways. Example implementations are provided below with reference to the following figures.

Example Architecture

Figure 1:
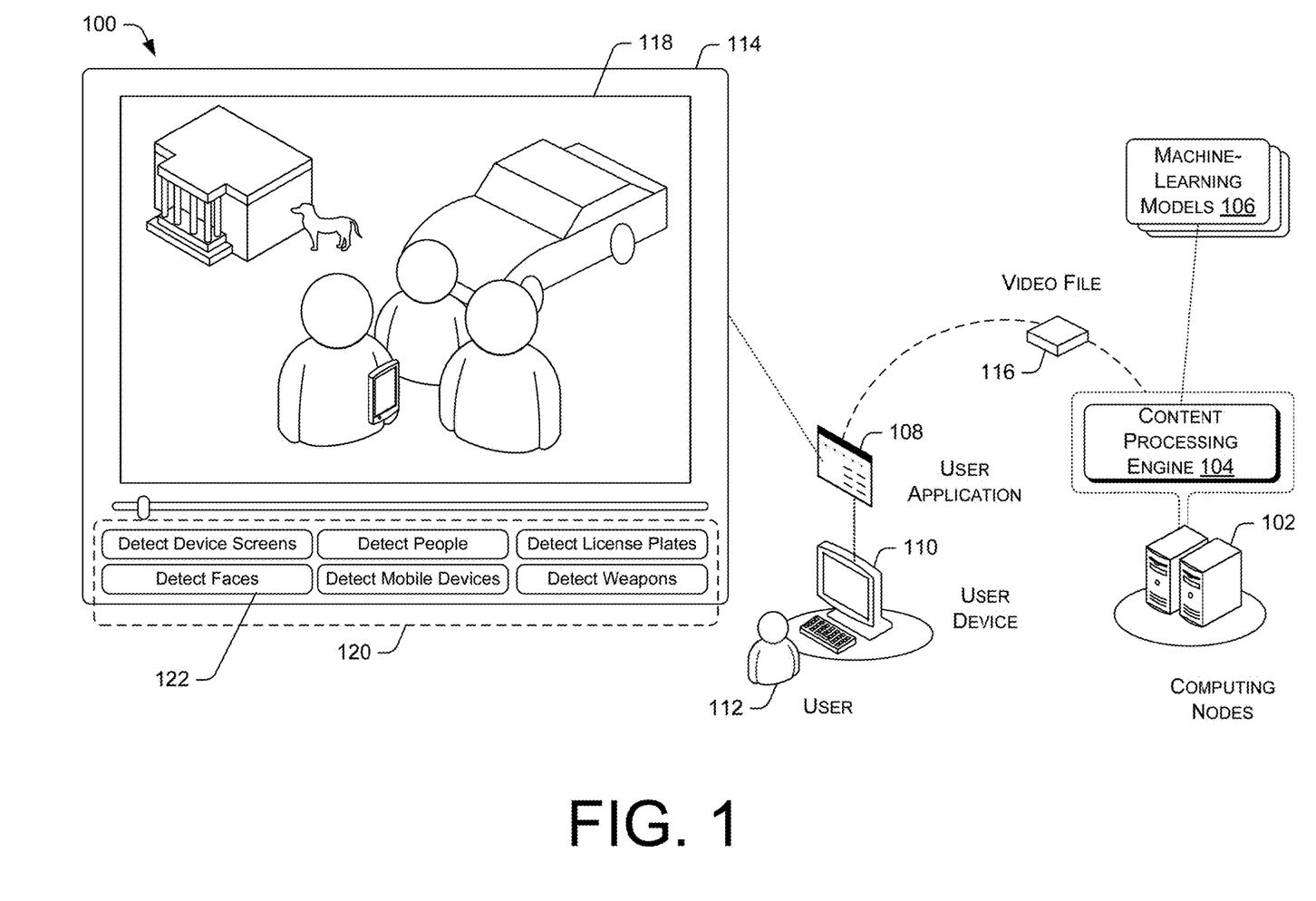
FIG. 1 illustrates an example architecture that provides an environment for selectively using machine-learning models for video content processing of video files based on user selection.

FIG. 1 illustrates an example architecture 100 that provides an environment for selectively using machine-learning models for video content processing of video files based on user selection. The environment may include one or more computing nodes 102 that supports a content process engine 104. The content processing engine 104 may include functions that enable a user to perform various data processing operation on data files, such as audio files and video files. The data processing operations may include accessing (e.g., playback), labeling, classification, redaction, analysis, and/or so forth. For example, in the context of law enforcement, the content processing engine 104 may enable such data processing operations to be performed on evidentiary or law enforcement activity data that includes audio files and data files. In various embodiments, the content processing engine 104 may be capable of applying multiple machine-learning models 106 to video files to detect objects of specific object types that are captured in the video files. Each of the multiple machine-learning models 106 may be trained to detect a particular type of object in a video file. For example, one of the machine-learning models may be trained to detect human faces that are captured in the video frames of a video file. In another example, another one of the machine-learning models may be trained to detect human shapes that are captured in the video frames of a video file. In an additional example, a third of the machine-learning models may be trained to detect a specific kind of weapon, such as a gun, that is captured in the video frames of a video file.

The content processing engine 104 may provide various user interface controls for a user to interact with the engine via a remote application, such as the user application 108 that is executing on a user device 110. The various user interface controls may be presented via one or more user interface screens that are generated by the content processing engine 104. The user application 108 may be a web browser or a dedicated thin-client application. The user device 110 may communicate with the content processing engine over a network. The network may be the Internet, a local area network (LAN), a wide area network (WAN), a cellular network, and/or some other network. In various embodiments, the user interface controls may be presented via one or more web pages that are generated by the content processing engine 104. For example, the web pages may be in the form of HyperText Markup Language (HTML) documents, in which the documents may include text content, images, multimedia content, cascade style sheets (CSS), and/or scripts. In such embodiments, the content processing engine 104 may use an application server that supports server-side scripting via multiple scripting languages, such as Active Server Pages (ASP), Hypertext Preprocessor (PHP), JavaScript, and other scripting languages to support the dynamic generation of web pages that presents output and receives input from a user via the user application 108.

In operation, a user 112 may use the user application 108 to interact with user interface controls of the content processing engine 104. Thus, as the user 112 is using an example user interface screen 114 to review (e.g., playing back) a video file 116 via the content processing engine 104, the user 112 may notice that a video frame 118 of the video file 116 contains one or more objects of a specific object type that is of interest to the user 112. For example, the user 112 may notice that the video frame 118 shows several human faces. Accordingly, the user may use user interface controls 120 that is presented on the example user interface screen 114 to apply a machine-learning model that is trained to detect the objects of the specific object type to the video frame 118. As shown, the user interface controls 120 may provide options for activating different machine-learning models to detect objects of various object types. For example, for the purpose of illustration, the options may include activating a machine-learning model to detect device screens, a machine-learning model to detect human shapes, a machine-learning module to detect license plates, a machine-learning model to detect human faces, a machine-learning model to detect mobile devices, and a machine-learning model to detect weapons. In this case, the user 112 may use the "detect faces" option 122 to initiate a corresponding machine-learning model to detect human faces in the video frame 118.

In turn, the machine-learning model may detect and highlight the objects of the specific object type in the video frame 118. The application of a machine-learning model may result in the content processing engine 104 drawing an outline shape that surrounds each object of the specific object type that is detected, as well as presenting a text label that indicates the object type of each object detected. For example, as shown in the user interface screen illustrated in FIG. 2, the machine-learning model configured to detect faces may have detected three human faces in the video frame 118. As such, the content processing engine 104 may have drawn an outline shape (e.g., a box 202) around each detected face and labeled each detected human face with the object type label "face" (e.g., a label 204).

Following a review of the objects in a video frame detected by the machine-learning model, the user may use the user interface controls to initiate one or more additional data processing operations on each object of the specific object type that is detected. In one instance, the user may initiate a tracking of the object of the specific object type across other video frames of the video file. For example, the content processing engine 104 may apply an object tracking algorithm to the object of the specific object type so that as the object appears in other video frames, the content processing engine 104 is able to highlight and identify the presence of the object in the other video frames. As shown in the example user interface screen 200 illustrated in FIG. 2, the user 112 may use the option 206 to initiate the tracking of the three detected faces in the video frames of the video file 116.

Figure 2:
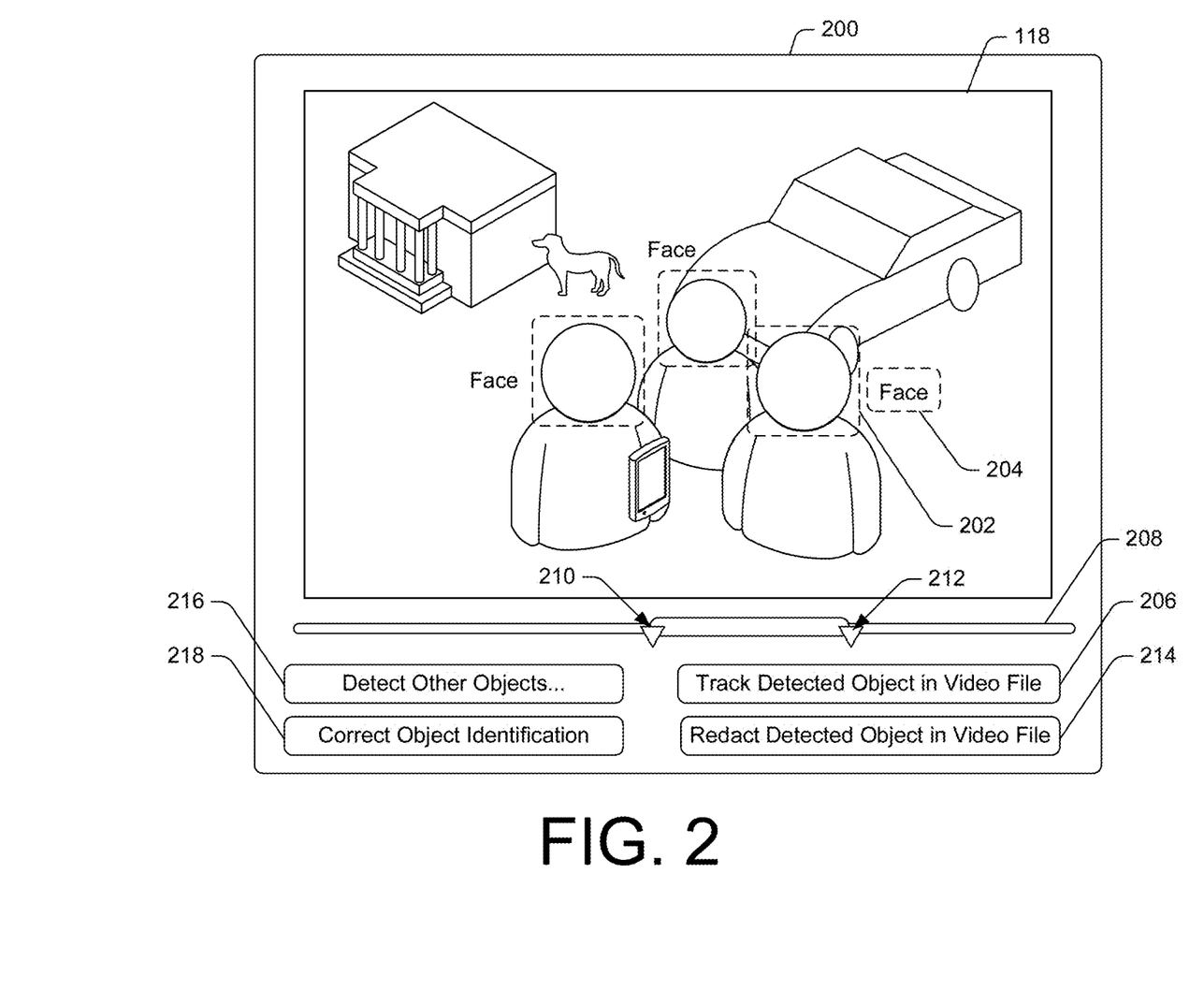
FIG. 2 illustrates an example user interface screen that shows various user interface controls for interacting with a content processing engine that selectively uses machine-learning models for video content processing of a video file based on user selection.

In some embodiments, the user interface controls that are provided may include a selection bar 208 that enables the user to play back a specific video portion of the video file, in which the entire selection bar 208 represents the time duration of the video file. In various embodiments, the selection bar 208 may include a start marker 210 that corresponds to the beginning of the video portion that the user desires to implement object tracking. The start marker 210 may be accompanied by a time indicator that shows time information. The selection bar 208 may further include an end marker 212 that corresponds to the end of the video portion that the user desires to implement object tracking. The end marker 212 may be accompanied by a time indicator that shows time information. Thus, by adjusting each of the start marker 210 and the end marker 212 along the selection bar 208, the user may select a particular portion of the video file, e.g., a specific set of video frames, or an entirety of the video file for which to implement object tracking.

In another instance, the user may initiate a redaction of the object from one or more video frames in the video file. In such an instance, the content processing engine 104 may apply the object tracking algorithm to the object of the specific object type until all appearances of the object in the one or more video frames are recognized. Subsequently, the content processing engine 104 may apply a redaction algorithm to render the appearances of the object in the one or more video frames visually unrecognizable. In various embodiments, the redaction algorithm may apply a pixelation effect, a blurring effect, an opaque overlay effect, and/or some other obfuscation effect to the appearances of the object in the one or more video frames. For example, as shown in FIG. 2, the user 112 may use the option 214 to initiate the redaction of the three detected faces from the video frames of the video file 116. In some instances, the user interface screen 200 may provide further options that may be selected for performing additional data processing operations on the detected objects (e.g., classification of the object by one or more additional attributes of the object, additional data analysis of the object, and/or so forth). Additionally, the option 216 shown in the user interface screen 200 may enable the user 112 to initiate the detection of objects of other object types in the video frame 118. Further, the option 218 may be used to initiate additional user interface controls for correcting the detection and labeling of an object in the video frame 118 by a machine-learning model.

Figure 3:
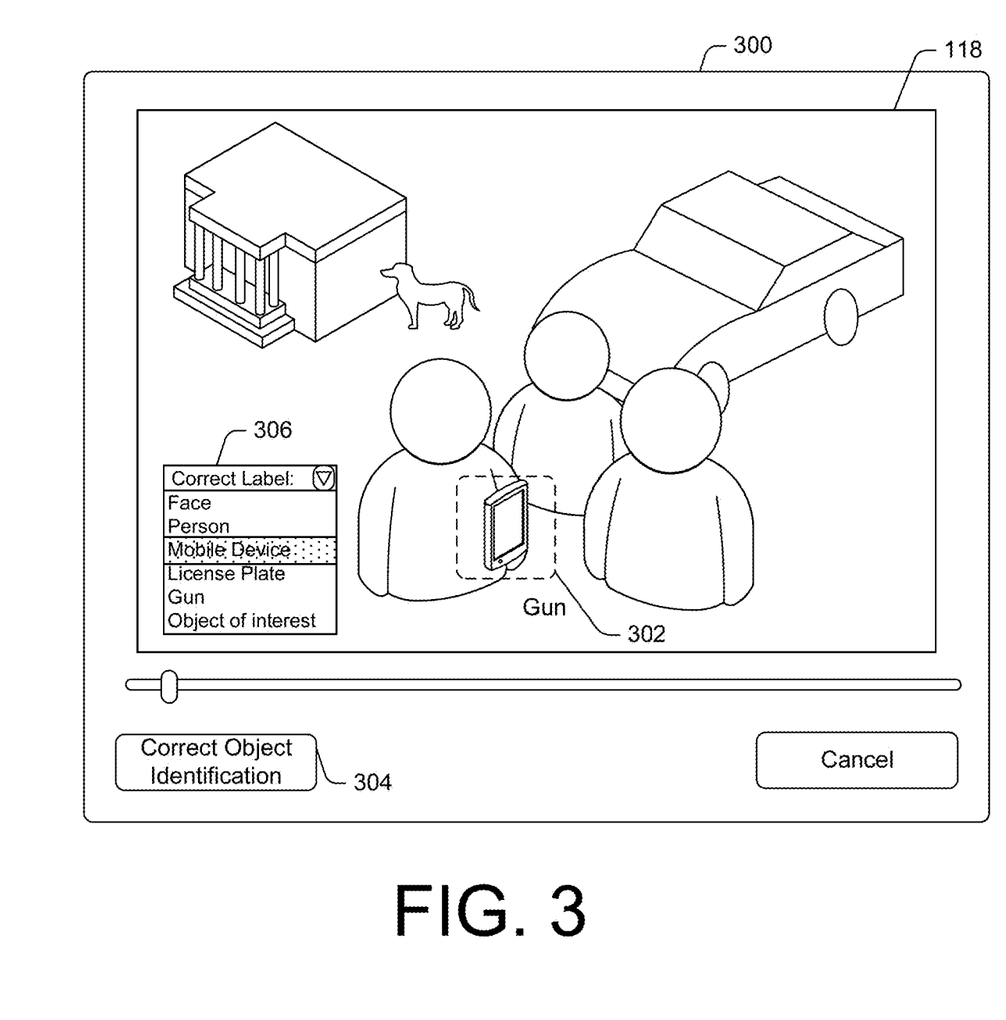
FIG. 3 illustrates an example user interface screen that shows user interface controls for correcting an object label that is assigned to an object depicted in a video file by a machine-learning model.

In other embodiments, the user interface controls of the content processing engine 104 may be used to correct an erroneous object type classification of an object in a video frame by a machine-learning model. For example, a particular machine-learning model may be trained to identify a gun in video frames of video files. However, as shown in the example user interface screen 300 illustrated in FIG. 3, if the particular machine-learning model erroneously identified a smartphone that is carried by a person as a gun in a video frame 118, the user 112 may select the erroneously identified image 302 and select a correct object identification option 304. The selection of the object identification option 304 may trigger the content processing engine 104 to provide a dropdown selection menu 306 that enables the user 112 to select a correct identification label (e.g., mobile device label) for the image 302. Subsequently, the image of the detected object and the corrective labeling information may be used by the content processing engine 104 as a part of training data to retrain the particular machine-learning model. In this way, the accuracy of the particular machine-learning model in recognizing an object of a specific object type may be improved.

In additional embodiments, the user interface controls of the content processing engine 104 may be used to submit information that results in the training of a new machine-learning model to recognize a new type of object. In one implementation, the user interface controls may be used by a user to select an image of an object of a specific object type that is of interest to the user but for which the user knows that no current machine-learning models of the content processing engine are able to recognize the object of the specific object type. In such an implementation, the user may select such an image of the object that is present in a video frame and indicate that the image capture an object of interest. For example, as shown with respect to the user interface screen 400 illustrated in FIG. 4, the user 112 may select such an image 402 of an object (e.g., a canine) in a video frame 118 that is of interest to the user but for which no current machine-learning models of the content processing engine 104 are able to recognize. In order to select the image 402, the user 112 may draw a perimeter border or apply a perimeter shape that surrounds the image 402. Subsequently, the user may select an option 404 to manually label the selected object. The selection of the option 404 may trigger the content processing engine 104 to provide a dropdown selection menu 406 that enables the user to label the image 402 as showing an object of the new object type, e.g., a new object of interest.

Figure 4:
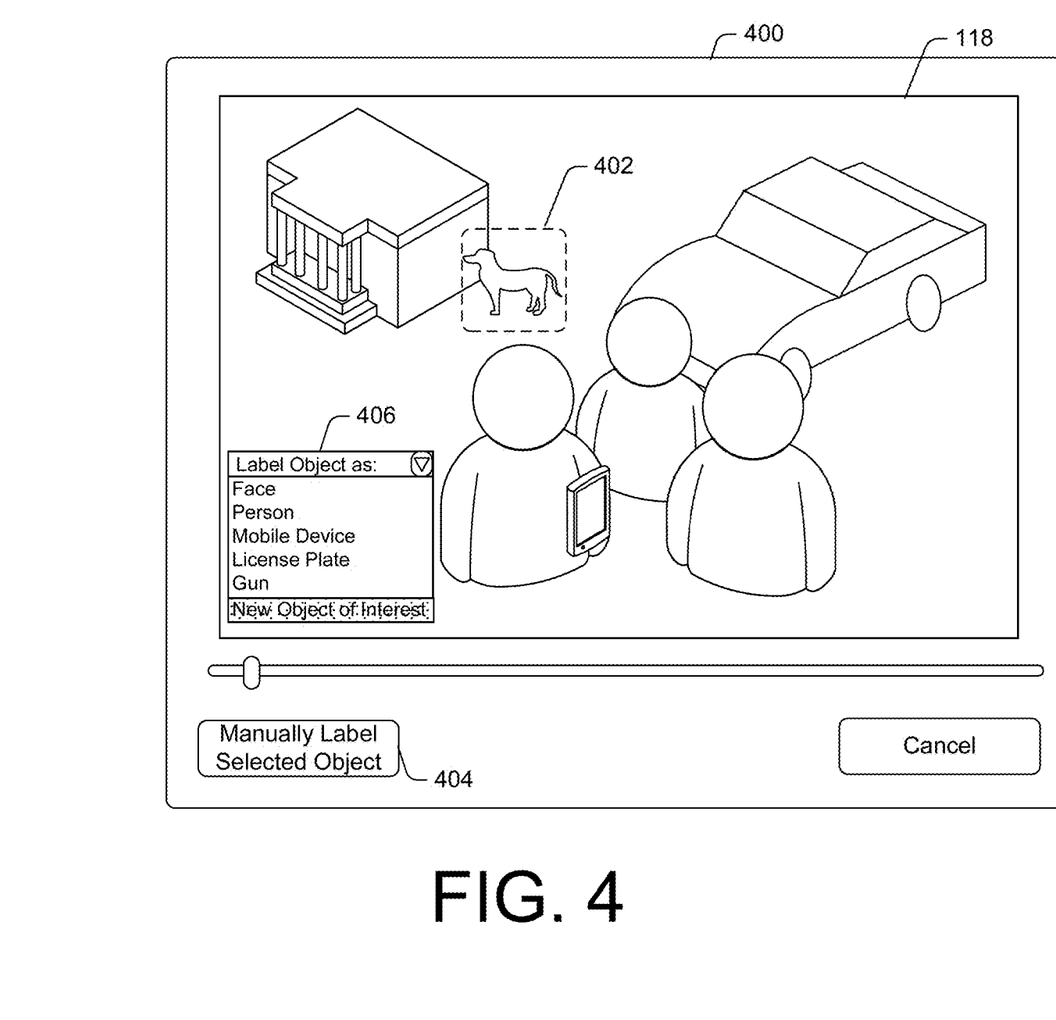
FIG. 4 illustrates an example user interface screen that shows user interface controls for notifying a content processing engine of an object of interest that the engine is unable to detect using existing machine-learning models.

Thus, if the number of submissions of the images with the objects of the specific object type (e.g., a canine) exceeds a predetermined threshold, an administrator of the content processing engine 104 may initiate the training of a new machine-learning model to recognize the objects of the specific object type. The new machine-learning module is then integrated into the content processing engine 104 for use. In this way, the content processing engine 104 may be used to detect the objects of the specific object type that the content processing engine 104 was previously unable to detect.

Returning to FIG. 1, a user may sequentially apply multiple machine-learning models that are trained to detect objects of different types to the same video frame. This is because the user may observe that the video frame contains objects of different types that are of interest. For example, as shown with respect to the video frame, the user may not only activate the "detect faces" option 122 of the user interface controls 120, but also any of the other options for detecting objects of other types in the user interface controls 120. In this way, the user may selectively apply machine-learning models that the user judges to be most applicable to video frames of a video file.

Example Content Processing Engine Components

Figure 5:
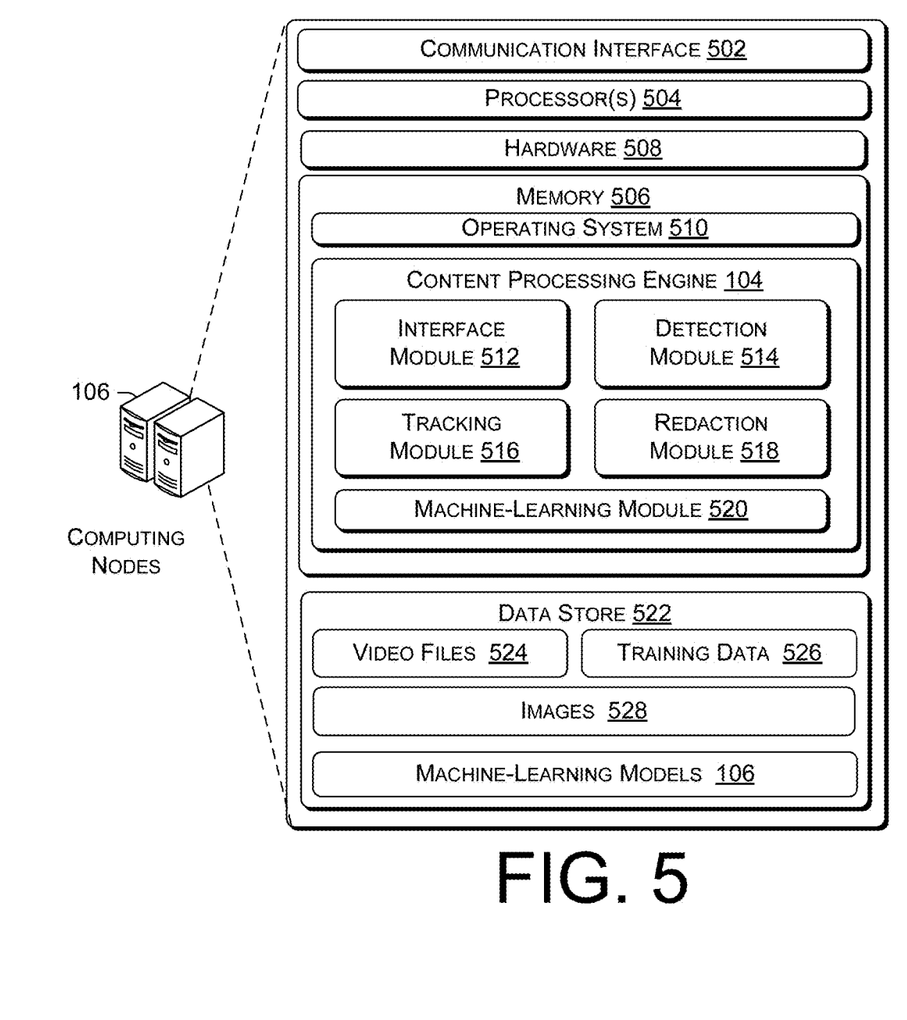
FIG. 5 is a block diagram showing various components of a content processing engine that is controllable by a user to selectively use different machine-learning models for video content processing of video files.

FIG. 5 is a block diagram showing various components of a content processing engine that is controllable by a user to selectively use different machine-learning models for video content processing of video files. The computing nodes 102 may provide a communication interface 502, one or more processors 504, memory 506, and hardware 508. The communication interface 502 may include wireless and/or wired communication components that enable the devices to transmit data to and receive data from other networked devices. The hardware 508 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 506 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 504 and the memory 506 of the computing nodes 102 may implement an operating system 510. In turn, the operating system 510 may provide an execution environment for the content processing engine 104. The operating system 510 may include components that enable the computing nodes 102 to receive and transmit data via various interfaces (e.g., user controls, communication interface, and/or memory input/output devices), as well as to process data using the processors 504 to generate output. The operating system 510 may include a presentation component that presents the output (e.g., display the data on an electronic display, store the data in memory, transmit the data to another electronic device, etc.). Additionally, the operating system 510 may include other components that perform various additional functions generally associated with an operating system.

The content processing engine 104 may include an interface module 512, a detection module 514, a tracking module 516, a redaction module 518, and a machine-learning module 520. The modules may include routines, program instructions, objects, and/or data structures that perform particular tasks or implement particular abstract data types. The memory 506 may also include a data store 522 that is used by the content processing engine 104.

The interface module 512 may include functionalities for streaming video files to a user application (e.g., user application 108) on a remote user device, such as the user device 110. For example, the interface module 512 may support media player functionalities that enable selection, playback, stop, pause, fast forward, rewind, video frame preview, video frame selection, and/or so forth for video files. In this way, a user of the user application may use the functionalities of the interface module 512 to select various video files stored in a content data store accessible to the content processing engine 104 for playback and review. The content data store may include a localized data store, a remote network data store, and/or so forth. Additionally, the interface module 512 may provide the user application with access to various user interface controls that enable the user to perform data processing operations with respect to the video files. Accordingly, the interface module 512 may receive various control inputs that are inputted by a user at the user application. In turn, the interface module 512 may perform corresponding operations with respect to the video files based on the control inputs, or direct other modules of the content processing engine 104 to perform operations based on the control inputs.

The detection module 514 may be activated to apply a specific machine-learning model that is trained to detect an object of a specific object type to perform object recognition with respect to video frames of video files. The specific machine-learning model may be one of multiple machine-learning models in which each is trained to detect an object of a specific object type. For example, the various machine-learning models may include a machine-learning model specifically trained to detect faces, a machine-learning model that is specifically trained to detect human shapes, a machine-learning model that is specifically trained to detect license plates, a machine-learning model that is specifically trained to detect mobile device display screens, a machine-learning model that is specifically trained to detect a particular weapon (e.g., a gun), and/or so forth.

In some alternative embodiments, machine-learning models may also be trained to detect an object of the same type, but which differs in relative size in the video frames. For example, a first machine-learning model may be trained to detect faces in which each face has an area with a number of pixels that is equal to or higher than a pixel number threshold. In contrast, a second machine-learning model may be trained to detect faces in which each face has an area with a number of pixels that is lower than the pixel number threshold. Thus, the first machine-learning model may be trained to detect larger faces (e.g., closer faces) while the second machine-learning model may be trained to detect small faces (e.g., far away faces) as captured in video frames. Thus, when a user initiates the detection of an object of a specific object type in a video frame, the detection module 514 may apply multiple machine-learning models that detect objects of the same type but different relative sizes to the video frame.

In some instances, a machine-learning model may provide a confidence score that indicates a likelihood that the probable object type corresponds to the analyzed image data of an image. In such instances, the detection module 514 may determine that an object of a specific object type is detected in an image when the confidence score is at or above a confidence score threshold. Conversely, the detection module 514 may determine that the object of the specific object type is not detected in the image when the confidence score is below the confidence score threshold. Once an object of a specific object type is detected, the detection module 514 may superimpose an indicator on the video frame to show that the object of the specific object type is detected. For example, the indicator may include an outline shape that surrounds the image of the object, as well as present a text label that indicates the object type of the object. Other indicator examples may include changing a background color of the image, using a flashing effect on the image, or otherwise altering the appearance of the image in some manner to call attention to the image. In various embodiments, the detection module 514 may append the information that supports the presentation of indicators for a video file as metadata to the video file. In additional instances, a second machine-learning model may identify an object in a video frame as being of a particular object type when the object was already previously identified by a first machine-learning model as being an object of another object type.

This is because multiple machine-learning models may be executed on the same video frame to detect objects of multiple object types that are captured in the video frame. In such instances, the detection module 514 may determine which machine-learning model provided a higher confidence score for its object type identification. Thus, if the first machine-learning model provided a higher confidence score for its object type identification than the second machine-learning model, the object type identification by the second machine-learning model may be discarded by the detection module 514. However, if the second machine-learning model provided a higher confidence score for its object type identification than the first machine-learning model, the detection module 514 may change the object type of the object from the initial object type to the object type identified by the second machine-learning model.

The tracking module 516 may be activated to track an object of a specific object type that is identified by a machine-learning model across multiple video frames. In some embodiments, the tracking may be performed using an object tracking algorithm that makes use of object pattern recognition. The object pattern recognition may reduce an image of the object to be tracked into a set of features. The object pattern recognition may then look for the set of features in the next video frame to track the object across multiple video frames. For example, the object tracking algorithm may be a target representation and localization algorithm, a filtering and data association algorithm, or some other comparable algorithm. For an object that is tracked across multiple video frames, the tracking module 516 may superimpose an indicator on each video frame to show that the object of the specific object type is being tracked across multiple video frames. For example, the indicator may include an outline shape that surrounds the image of the object, as well as present a text label obtained from the detection module 514 that indicates the object type of the object. This may result in the object being shown as being bounded by an outline shape with an object type label as the object moves around in a field of view as the video file is being played back. In some embodiments, the tracking module 516 may provide user interface controls that enable a user to select a particular video portion of the video file (e.g., a specific set of frames), for which the tracking of an object of an object type may be performed. In some instances, the tracking module 516 may track an object of a specific object type across multiple video frames of a video file after the user has corrected the object type label for the object.

In other embodiments, the object pattern recognition may be fine-tuned to detect to not only track objects of specific types, but objects of the specific types with specific feature attributes. For example, the object pattern recognition may be used to track the face of a particular person or a particular license plate across multiple video frames. In such embodiments, the tracking module 516 may provide additional user interface control accessible via a user application, such as the user application 108, that enables users to select objects with specific feature attributes for tracking across the multiple video frames. For example, the user interface controls may be used to independently track images of objects of the same type but of different relative sizes in video frames.

The redaction module 518 may be activated to redact the image of an object in a video frame that is identified via the detection module 514 and/or the tracking module 516. The redaction module 518 may redact the image of the object by applying a visual effect on the image of the object. For example, the visual effect may include a pixelation effect, a blurring effect, an opaque overlay effect, and/or some other obfuscation effect that renders the object in the image unrecognizable. In various embodiments, the visual effect may be a one-way effect that causes the loss of data from the image, such that the one-way effect is not reversible.

The machine-learning module 520 may be activated to train the various matching-learning models that are used for object detection. Each of the machine learning models may be trained via a model training algorithm. The model training algorithm may implement a training data input phase, a feature engineering phase, and a model generation phase. In the training data input phase, the model training algorithm may receive training data. For example, the training data set for training a particular machine-learning model to detect a specific object type may include positive training data in the form of object images that are labeled with the specific object type. However, in some instances, the training data set may include negative training data in the form of object images that are labeled with one or more other object types. During the feature engineering phase, the model training algorithm may pinpoint features in the training data. Accordingly, feature engineering may be used by the model training algorithm to figure out the significant properties and relationships of the input datasets that aid a machine learning model to distinguish between different classes of data.

During the model generation phase, the model training algorithm may select an initial type of machine learning algorithm to train a machine learning model using the training data. Following the application of a selected machine learning algorithm to the training data to train a machine-learning model, the model training algorithm may determine a training error measurement of the machine-learning model. If the training error measurement exceeds a training error threshold, the model training algorithm may use a rule engine to select a different type of machine learning algorithm based on a magnitude of the training error measurement to train the machine-learning model. The different types of machine learning algorithms may include a Bayesian algorithm, a decision tree algorithm, a support vector machine (SVM) algorithm, an ensemble of trees algorithm (e.g., random forests and gradient-boosted trees), an artificial neural network, and/or so forth. The training process is generally repeated until the training results fall below the training error threshold and the trained machine learning model is generated.

In some embodiments, the machine learning models for detecting an object of a specific object type may be trained using different sets of training data, such as images showing objects of the same object type but with other object attributes that are different. These attributes may include size, color, texture, and/or so forth. For example, a first set of training data for training a first machine-learning model may include images of faces in which each face has an area with a number of pixels that is equal to or higher than a pixel number threshold. In contrast, a second set of training data for training a second machine-learning model may include faces in which each face has an area with a number of pixels that is lower than the pixel number threshold. In another example, a first machine-learning model may be trained to detect a specific vehicle type of a first color while a second machine-learning model may be trained to detect the specific vehicle of a second color (e.g., red trucks vs. blue trucks). In this way, multiple machine-learning models may be trained to detect objects of the same object type, but with other object attributes that are different.

In additional embodiments, the machine-learning module 520 may periodically retrain existing machine-learning models with new or modified training data sets. In some embodiments, a modified training data set may include images that have been newly labeled as showing objects of specific object types. For example, the images may include an image of an object that has been previously erroneously classified by a first machine-learning model as being of a first object type, but which is then specifically labeled by a user as being an image of an object of a second object type that is detectable by a second machine-learning model. Such a re-labeled image may be received by the machine-learning module 520 and stored in the data store 522. Accordingly, the re-labeled image may be eventually used by the machine-learning module 520 as negative training data for the first machine-learning model and/or positive training data for the second machine-learning model. Thus, when the number of such re-labeled images reaches a predetermined numerical threshold, the machine-learning module 520 may incorporate such relabeled images into the existing training data set for the first machine-learning model and/or the existing training data set for the second machine-learning model, and then initiate a retraining of one or more these models using the modified training data sets.

In other embodiments, the machine-learning module 520 may train a new machine-learning model to detect an object of a new object type. In such embodiments, users may submit images of new objects of interest via user interface controls provided by the machine-learning module 520. Such images may be periodically reviewed by an administrator of the content processing engine 104. In some instances, if the administrator determines that the number of images of a particular object (e.g., a canine) as submitted during a particular time period has exceeded a numerical threshold, the administrator may prepare a training data set (e.g., labeled images of similar objects) for training a new machine-learning model to automatically detect the particular object. Subsequently, the administrator may initiate the machine-learning module 520 to train the new machine-learning model to automatically detect the particular object. Once the new machine-learning model is trained, the user interface controls of the detection module 514 may be modified to enable users to use the new machine-learning model.

In some embodiments, the content processing engine 104 may further include an access control function. The access control function may be used to ensure that only authorized users of the content processing engine 104 are able to access the functionalities of the engine by submitting the correct user credentials via a user application, such as the user application 108. The data store 522 may store data that is processed and/or generated by the various modules of the content processing engine 104. For example, the data that is stored in the data store 522 may include machine-learning models 106, video files 524, training data 526, and images 528. The video files 524 may include original versions of video files, video files that have been marked up with metadata indicating detected objects, and/or video files that have been redacted. The images 528 may include re-labeled images and images of new objects of interest.

Example Processes

Figure 6:
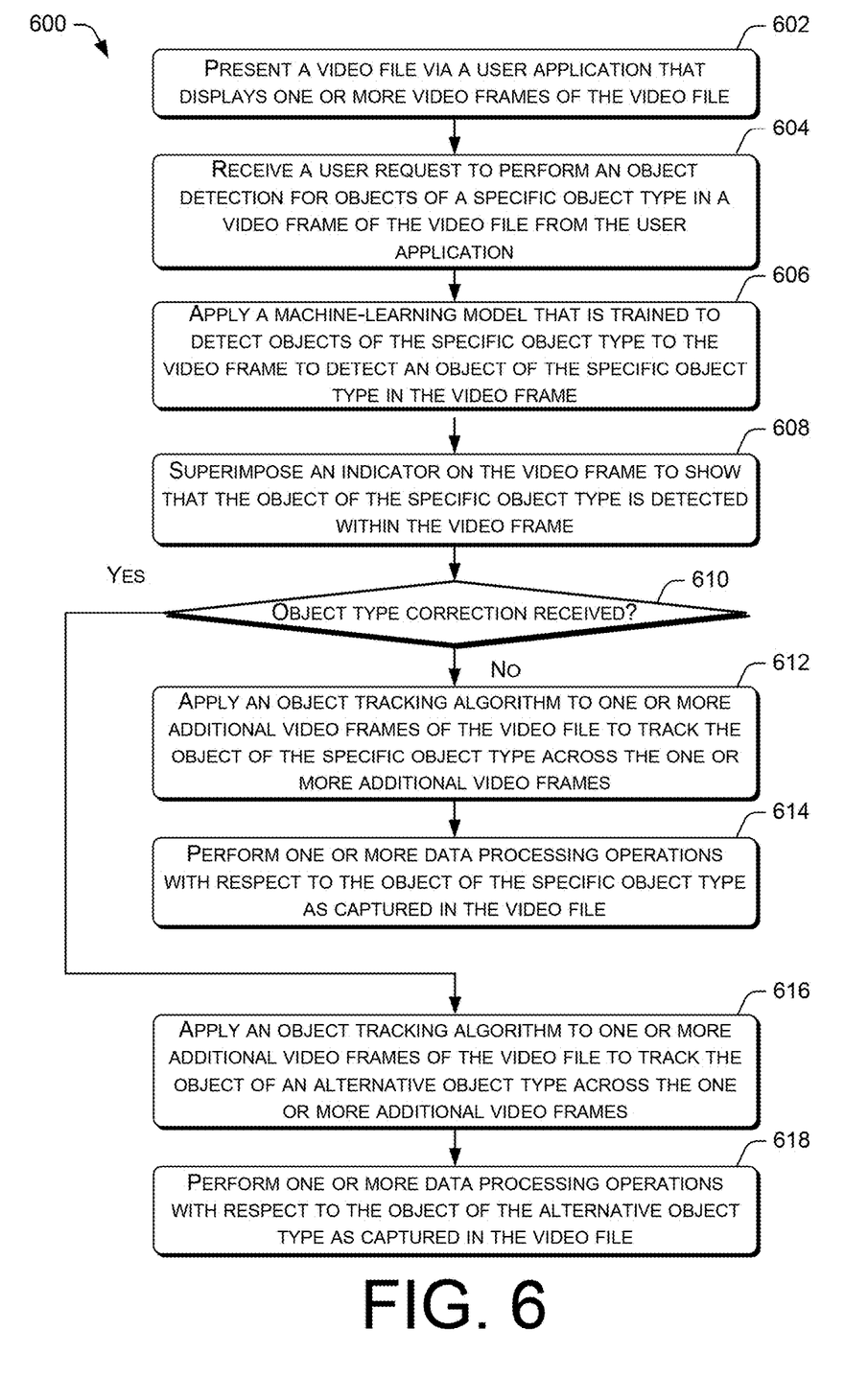
FIG. 6 is a flow diagram of an example process of using user input to select a machine-learning model of multiple machine-learning models to apply to a video frame of a video file to detect a particular type of object.
Figure 7:
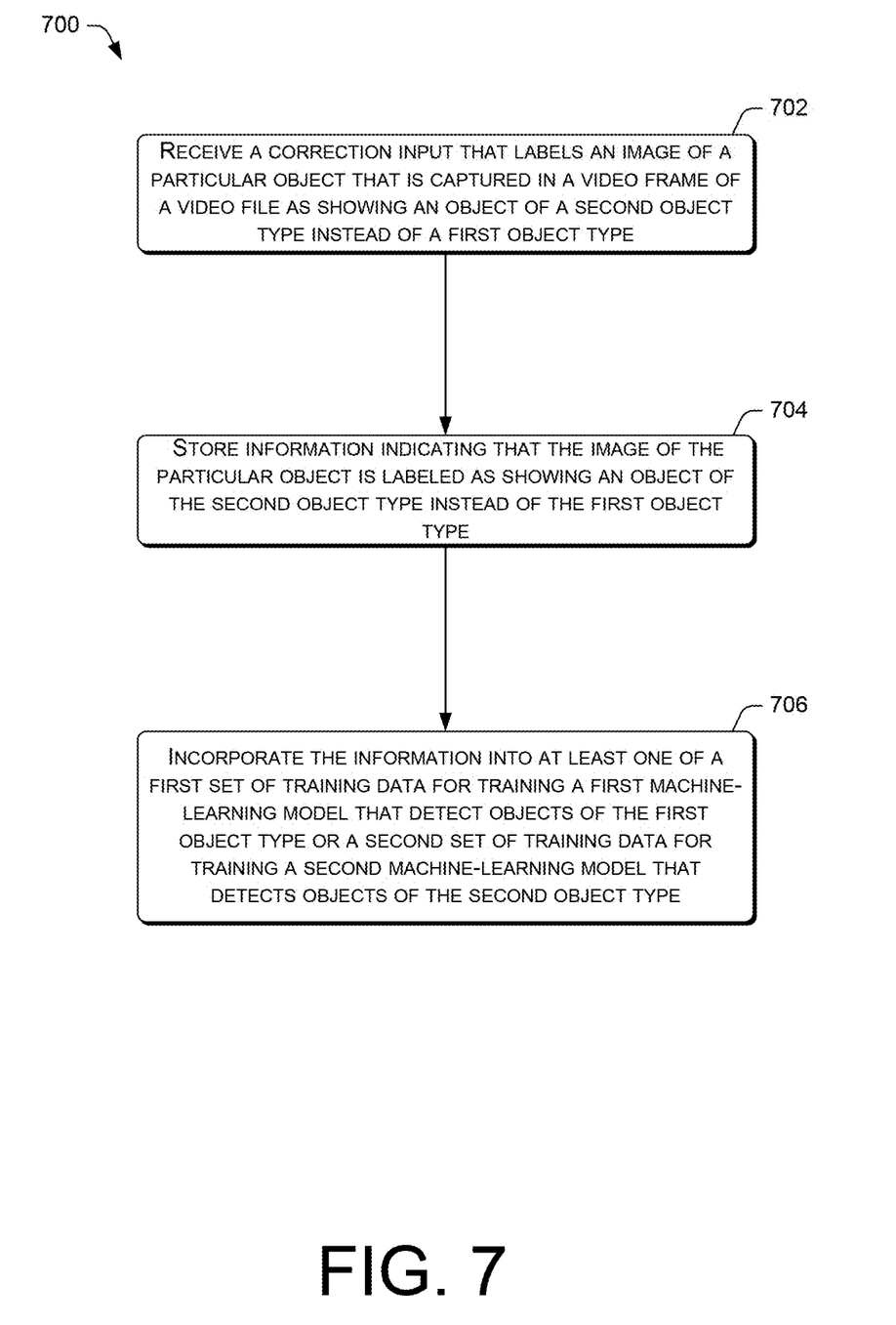
FIG. 7 is a flow diagram of an example process of using user inputted data to generate training data for retraining one or more existing machine-learning models.
Figure 8:
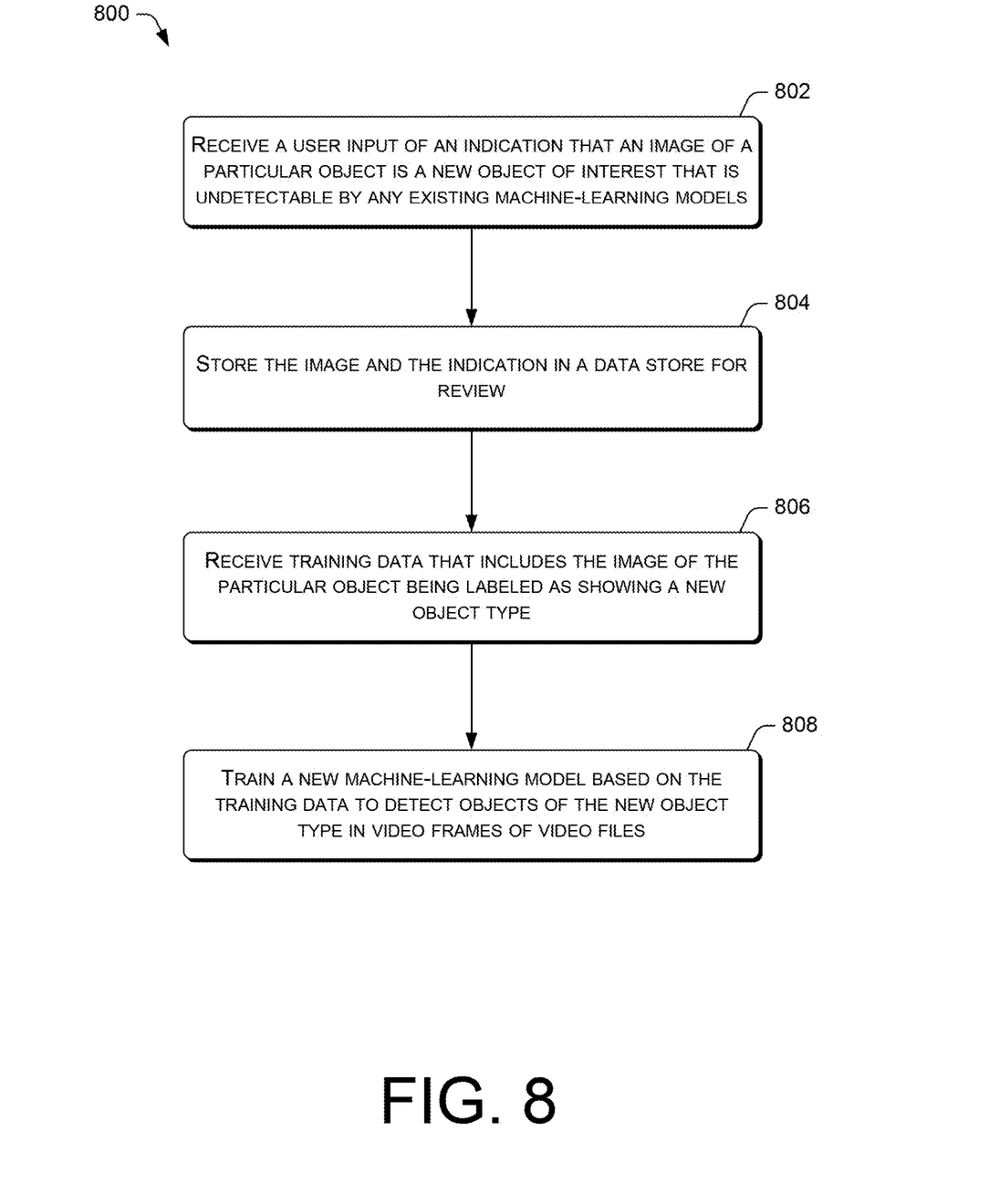
FIG. 8 is a flow diagram of an example process of using user inputted data to generate training data for training a new machine-learning model.

FIGS. 6-8 present illustrative processes 600-800 for selectively using machine-learning models for video content processing of video files based on user selection. Each of the processes 600-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-800 are described with reference to the architecture 100 of FIG. 1.

FIG. 6 is a flow diagram of an example process 600 of using user input to select a machine-learning model of multiple machine-learning models to apply to a video frame of a video file to detect a particular type of object. At block 602, the content processing engine 104 may present a video file via a user application that displays one or more video frames of the video frame. In various embodiments, the user application may be an application executing on a user device that is communicatively coupled to the content processing engine 104 via a network.

At block 604, the content processing engine 104 may receive a user request to perform an object detection for objects of a specific object type in a video frame of the video file. In various embodiments, that user request may be submitted via user interface controls that are provided by the content processing engine 104 and presented to a user via the user application. The user may submit the user request after manually reviewing the video frame and determining that at least one object of the specific object type is present in the video frame. At block 606, the content processing engine 104 may apply a machine-learning model that is trained to detect objects of the specific object type to the video frame to detect an object of the specific object type in the video frame. The machine-learning model may be one of multiple machine-learning models in which each machine-learning model is trained to detect objects of a corresponding object type. At block 608, the content processing engine 104 may superimpose an indicator on the video frame to show that the object of the specific object type is detected within the video frame. For example, the content processing engine 104 may draw an outline shape that surrounds the object of the specific object type that is detected in the video frame, as well as present a text label that indicates the object type of the object detected.

At decision block 610, the content processing engine 104 may determine whether an object type correction is received for the object that is detected. In various embodiments, the object type correction may be inputted by a user via user interface controls provided by the content processing engine 104. The user may input the object type correction after noticing that an object purported to be of the specific type that is detectable via the machine-learning model is actually not of the specific type. For example, the machine-learning model may be trained to identify a gun in the video frame but may have erroneously identified a smartphone that is carried by a person as a gun. In some instances, the object type correction may be inputted via a dropdown selection menu that lists various object types.

If no object type correction is received ("no" at decision block 610), the process 600 may proceed to block 612. At block 612, the content processing engine 104 may apply an object tracking algorithm to one or more additional video frames of the video file to track the object of the specific object type across the one or more additional video frames. For an object that is tracked across multiple video frames, the content processing engine 104 may superimpose an indicator on each video frame to show that the object of the specific object type is being tracked across multiple video frames. For example, the indicator may include an outline shape that surrounds the image of the object, as well as present a text label that indicates the object type of the object. At block 614, the content processing engine 104 may perform one or more data processing operations with respect to the object of the specific object type as captured in the video file. For example, the one or more data processing operations may include a redaction of the object in one or more video frames, a further classification of the object by one or more additional attributes of the object, additional data analysis of the object (e.g., facial recognition, license plate recognition, etc.), and/or so forth.

However, if an object type correction is received ("yes" at decision block 610), the process 600 may proceed to block 616. At block 616, the content processing engine 104 may apply an object tracking algorithm to one or more additional video frames of the video file to track the object of an alternative specific object type across the one or more additional video frames. The alternative specific object type is different from the specific object type that the machine-learning model is supposed to detect. For an object that is tracked across multiple video frames, the content processing engine 104 may superimpose an indicator on each video frame to show that the object of the specific object type is being tracked across multiple video frames. For example, the indicator may include an outline shape that surrounds the image of the object, as well as present a text label that indicates the object type of the object.

At block 618, the content processing engine 104 may perform one or more data processing operations with respect to the object of the alternative object type as captured in the video file. For example, the one or more data processing operations may include a redaction of the object in one or more video frames, a further classification of the object by one or more additional attributes of the object, additional data analysis of the object (e.g., facial recognition, license plate recognition, etc.), and/or so forth.

FIG. 7 is a flow diagram of an example process 700 of using user inputted data to generate training data for retraining one or more existing machine-learning models. At block 702, the content processing engine 104 may receive a correction input that labels an image of a particular object that is captured in a video frame of a video file as showing an object of a second object type instead of a first object type.

At block 704, the content processing engine 104 may store information indicating that the image of the particular object is labeled as showing an object of the second object type instead of the first object type. At block 706, the content processing engine 104 may incorporate the information into at least one of a first set of training data for training a first machine-learning model that detects objects of the first object type or a second set of training data for training a second machine-learning model that detects objects of the second object type. In some instances, the information may be incorporated as negative training data for retraining the first machine-learning model. In other instances, the information may be incorporated as positive training data for training or retraining the second machine-learning model.

FIG. 8 is a flow diagram of an example process 800 of using user inputted data to generate training data for training a new machine-learning model. At block 802, the content processing engine 104 may receive a user input of an indication that an image of a particular object is a new object of interest that is undetectable by any existing machine-learning models. For example, a user may use user interface controls provided by the content processing engine 104 to select the image and label the image as showing a new object of interest.

At block 804, the content processing engine 104 may store the image and the indication in a data store for review by an administrator. During the review, the administrator may examine the stored images to determine the object type of the particular object in the image, whether other images stored in the data store also captured images of the particular object of the object type, as well as how many of such images have been submitted in a predetermined time period. At block 806, the content processing engine 104 may receive training data that includes the image of the particular object being labeled as showing a new object type. For example, the administrator may prepare the training data after determining that a number of images showing the particular object as received during the predetermined time period exceed a numerical threshold, at which point the administrator may use the user interface controls of the content processing engine 104 to label such images as showing the new object type in order to generate training data.

At block 808, the content processing engine 104 may train a new machine-learning model based on the training data to detect objects of the new object type in video frames of video files. For example, the administrator may use the user interface controls of the content processing engine 104 to initiate the training of the new machine-learning model based on the training data.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that, upon execution, cause one or more processors to perform operations for tracking objects in videos, the operations comprising:
presenting a video file via a user application, the video file including a plurality of video frames;
receiving, from the user application, a user request for detecting an object of an object type in the video file;
detecting the object of the object type in a first one of the plurality of video frames by one of a plurality of machine-learning models, the one of the plurality of machine-learning models being configured to detect a plurality of objects of the object type, wherein the plurality of machine-learning models are trained to detect a plurality of objects of a plurality of object types, and the plurality of object types include the object type; and
tracking the object of the object type on a second one of the plurality of video frames of the video file by an object tracking algorithm, the object tracking algorithm including a target representation and localization algorithm or a filtering and data association algorithm.

2. The one or more non-transitory computer-readable media of claim 1, wherein the operations further comprise performing a data processing operation with respect to the object of the object type as captured in the video file.

3. The one or more non-transitory computer-readable media of claim 2, wherein the data processing operation includes redacting the object from one of the plurality of video frames of the video file.

4. The one or more non-transitory computer-readable media of claim 1, wherein the object is a first object, the object type is a first object type, and the operations further comprise:
receiving an object type correction for a second object in the first video frame, the second object being detected by the one of the plurality of machine-learning models, the object type correction indicating that the second object is of a second object type; and
tracking the second object of the second object type on a third one of the plurality of video frames of the video file.

5. The one or more non-transitory computer-readable media of claim 4, wherein the one of the plurality of machine-learning models is a first machine-learning model, and the operations further comprise:
storing information indicating that the second object is of the second object type; and
incorporating the information into at least one of a first set of training data for training the first machine-learning model or a second set of training data for training a second one of the plurality of machine-learning models, the second machine-learning model being configured to detect a plurality of objects of the second object type.

6. The one or more non-transitory computer-readable media of claim 1, wherein the video file is a first video file, and the operations further comprise:
receiving an indication that an object of interest is undetectable by the plurality of machine-learning models;
storing an image of the object of interest and the indication in a data store for a review;
receiving training data including the image of the object of interest labeled as an object type of interest; and
training a machine-learning model based on the training data to detect a plurality of objects of the object type of interest in at least one of the first video file or a second video file.

7. The one or more non-transitory computer-readable media of claim 6, wherein the operations further comprise:
determining, before receiving the training data, a number of a plurality of images of the object of interest received during a predetermined time period exceeds a numerical threshold.

8. The one or more non-transitory computer-readable media of claim 1, wherein the user request is a first user request, the object is a first object, the object type is a first object type, the one of the plurality of machine-learning models is a first machine-learning model, and the operations further comprise:
receiving, from the user application, a second user request for detecting a second object of a second one of the plurality of object types in the video file;
detecting the second object of the second object type in a third one of the plurality of video frames by a second one of the plurality of machine-learning models, the second machine-learning model being configured to detect a plurality of objects of the second object type; and
tracking the second object of the second object type on a fourth of the plurality of video frames of the video file by the object tracking algorithm.

9. The one or more non-transitory computer-readable media of claim 1, wherein the plurality of machine-learning models are trained to detect the plurality of objects of the plurality of object types, respectively.

10. The one or more non-transitory computer-readable media of claim 1, wherein the one of the plurality of machine-learning models is a first machine-learning model, and the plurality of machine-learning models include a second machine-learning model and a third machine-learning model trained to detect a plurality of objects of one of the plurality of object types with different object sizes.

11. A system for tracking objects in videos, the system comprising:
one or more processors; and
one or more memories including a plurality of computer-executable instructions that are executable by the one or more processors to perform a plurality of operations for tracking objects in videos, the operations comprising:
presenting a video file via a user application, the video file including a plurality of video frames;
receiving, from the user application, a user request for detecting an object of an object type in the video file;
detecting the object of the object type in a first one of the plurality of video frames by one of a plurality of machine-learning models, the one of the plurality of machine-learning models being configured to detect a plurality of objects of the object type, wherein the plurality of machine-learning models are trained to detect a plurality of objects of a plurality of object types, and the plurality of object types include the object type; and
tracking the object of the object type on a second one of the plurality of video frames of the video file by an object tracking algorithm, the object tracking algorithm including a target representation and localization algorithm or a filtering and data association algorithm.

12. The system of claim 11, wherein the operations further comprise redacting the object from one of the plurality of video frames of the video file.

13. The system of claim 11, wherein the object is a first object, the object type is a first object type, and the operations further comprise:
receiving an object type correction for a second object in the first video frame, the second object detected by the one of the plurality of machine-learning models, the object type correction indicating that the second object is of a second object type; and
tracking the second object of the second object type on a third one of the plurality of video frames of the video file.

14. The system of claim 13, wherein the one of the plurality of machine-learning models is a first machine-learning model, and the operations further comprise:
storing information indicating that the second object is of the second object type; and
incorporating the information into at least one of a first set of training data for training the first machine-learning model or a second set of training data for training a second one of the plurality of machine-learning models, the second machine-learning model being configured to detect a plurality of objects of the second object type.

15. The system of claim 11, wherein the video file is a first video file, and the operations further comprise:
receiving an indication that an object of interest is undetectable by the plurality of machine-learning models;
storing an image of the object of interest and the indication in a data store for a review;
receiving training data including the image of the object of interest labeled as an object type of interest; and
training a machine-learning model based on the training data to detect a plurality of objects of the object type of interest in at least one of the first video file or a second video file.

16. A computer-implemented method for tracking objects in videos, the computer-implemented method comprising:
presenting a video file via a user application, the video file including a plurality of video frames;
receiving, from the user application, a user request for detecting an object of an object type in the video file;
detecting the object of the object type in a first one of the plurality of video frames by one of a plurality of machine-learning models, the one of the plurality of machine-learning models being configured to detect a plurality of objects of the object type, wherein the plurality of machine-learning models are trained to detect a plurality of objects of a plurality of object types, and the plurality of object types include the object type; and
tracking the object of the object type on a second one of the plurality of video frames of the video file by an object tracking algorithm, the object tracking algorithm including a target representation and localization algorithm or a filtering and data association algorithm.

17. The computer-implemented method of claim 16, further comprising:
redacting the object from one of the plurality of video frames of the video file.

18. The computer-implemented method of claim 16, wherein the object is a first object, the object type is a first object type, and the computer-implemented method further comprising comprises:
receiving an object type correction for a second object in the first video frame, the second object detected by the one of the plurality of machine-learning models, the object type correction indicating that the second object is of a second object type; and
tracking the second object of the second object type on a third one of the plurality of video frames of the video file.

19. The computer-implemented method of claim 18, wherein the one of the plurality of machine-learning models is a first machine-learning model, and the computer-implemented method further comprises:
storing information indicating that the second object is of the second object type; and
incorporating the information into at least one of a first set of training data for training the first machine-learning model or a second set of training data for training a second one of the plurality of machine-learning models, the second machine-learning model being configured to detect a plurality of objects of the second object type.

20. The computer-implemented method of claim 16, wherein the video file is a first video file, and the computer-implemented method further comprises:
receiving an indication that an object of interest is undetectable by the plurality of machine-learning models;
storing an image of the object of interest and the indication in a data store for a review;
receiving training data including the image of the object of interest labeled as an object type of interest; and
training a machine-learning model based on the training data to detect a plurality of objects of the object type of interest in at least one of the first video file or a second video file.

* * * * *